United States Patent [19]

Obara

[11] Patent Number: 5,071,334
[45] Date of Patent: Dec. 10, 1991

[54] MULTIPLE TRANSFER MOLDING DIE

[75] Inventor: Shoji Obara, Fukuoka, Japan

[73] Assignee: Kabushiki Kaisha Toshiba, Kanagawa, Japan

[21] Appl. No.: 635,654

[22] Filed: Dec. 28, 1990

[30] Foreign Application Priority Data

Jan. 5, 1990 [JP] Japan .................................. 2-000264

[51] Int. Cl.$^5$ ...................... B29C 45/02; B29C 45/16; B29C 45/27
[52] U.S. Cl. ............................. 425/116; 264/272.170; 425/121; 425/544; 425/588; 425/DIG. 228
[58] Field of Search ...................... 264/272.12, 272.17; 425/116, 125, 543, 544, 588, DIG. 228, 121, 4, 572; 249/95

[56] References Cited

U.S. PATENT DOCUMENTS

| | | | |
|---|---|---|---|
| 3,779,506 | 12/1973 | Adams | 425/572 |
| 4,111,635 | 9/1978 | Reinville | 425/572 |
| 4,252,294 | 2/1981 | Lichio | 425/572 |
| 4,451,224 | 5/1984 | Harding | 425/572 |
| 4,697,784 | 10/1987 | Schmid | 425/588 |
| 4,752,199 | 6/1988 | Arai | 425/588 |
| 4,900,501 | 2/1990 | Saeki et al. | 425/116 |

*Primary Examiner*—Jay H. Woo
*Assistant Examiner*—Khanh P. Nguyen
*Attorney, Agent, or Firm*—Finnegan, Henderson, Farabow, Garrett, and Dunner

[57] ABSTRACT

A multiple transfer molding die for molding a plurality of semiconductor devices includes a plurality of resin paths between a pot and a plurality of cavities. Each resin path includes a first runner portion whose cross sectional area is determined according to the length between the center of the pot and the end of the first runner portion.

6 Claims, 2 Drawing Sheets

MULTIPLE TRANSFER MOLDING DIE

BACKGROUND OF THE INVENTION

1. Field of the Invention

This invention concerns a multiple transfer molding die used for molding a plurality of semiconductor devices. More particularly, this invention concerns a construction of a runner or a resin path between a pot and cavities in a multiple transfer molding die.

2. Description of the Prior Art

Conventionally, a multiple transfer molding die is used to mold a plurality of semiconductor devices.

FIGS. 1 and 2 are drawings of a conventional multiple transfer molding die. In the drawings, only one plunger and half of the group of cavities disposed around the plunger are shown for convenience of the description. FIG. 1 is a cross sectional view, and FIG. 2 is a plan view of the molding die.

In the drawings, numeral 1 designates an upper die portion, numeral 2 designates a lower die portion, numeral 3 is a pot, and numeral 4 is a plunger. Numeral 5 designates cavities. Numeral 8 shows a resin tablet put in the pot 3 to be transferred to the cavities by the press of the plunger 4. Numeral 11 designates a center block which includes the pot 3 and the plunger 4. Numeral 12 designates a cull runner, 13 designates a sub-runner and 14 designates a gate runner. Numeral 15 designates gates. A semiconductor chip 7 mounted on a lead frame 6 is disposed in the cavity 5. The lead frame 6 is cramped by the upper die 1 and the lower die 2, and the semiconductor chip 7 is electrically connected to the lead frame 6 by bonding wires 10.

In this construction, as is well known, when the plunger 4 is pushed up, the resin tablet 8 in gel condition is transferred to the cavity 5 through the cull runner 12, the sub-runner 13, the gate runner 14 and the gate 15.

In the conventional die, the sub-runner 13 is formed in parallel to the longitudinal axis of the lead frame 6. Thus, the path between the pot 3 and the cavity 5a becomes longer than that of between the pot 3 and the cavity 5b (see FIG. 2). Therefore, the mold resin reaches cavity 5b first, which causes a time lag with respect to when the other cavities are filled with resin.

The pressure is not applied to any cavity until all the cavities are filled with the resin. Thus, when the resin hardens rapidly, the hardening progresses in an inadequate condition in the cavity 5b, and sometimes voids are formed in the housing of the semiconductor devices. Even if no voids are formed, the somewhat hardened resin may cause a wire deformation or a wire cut in an extreme case.

Furthermore, to allow automated continuous molding, an appropriate margin for the molding time is required. For example, the transferring time of resin, namely the time from the beginning of the plunger push up to the beginning of the curing, varies about 2 seconds in an automated molding.

SUMMARY OF THE INVENTION

Therefore, an object of the present invention is to provide a multiple transfer molding die which reduces the time lag in the filling time for the cavities.

Another object of the present invention is to provide a multiple transfer molding die which is preferable for use in an automated molding process.

To achieve the objects, this invention provides a multiple transfer molding die for molding a plurality of semiconductor devices, comprising: a pot for storing molding material; a plurality of cavities for accepting the semiconductor devices; and a plurality of runners for individually connecting the pot to a corresponding cavity, each runner including a first runner portion having predetermined cross sectional area, wherein the cross sectional area of the first runner portion is proportionally larger as its length increases.

BRIEF DESCRIPTION OF THE DRAWINGS

The accompanying drawings, which are incorporated in and constitute a part of the specification, illustrate an embodiment of the invention, and, together with the description, serve to explain the principles of the invention. Referring now to the drawings, like reference characters designate like or corresponding parts throughout the several views. In the drawings.

DETAILED DESCRIPTION OF THE INVENTION

Figure 1:
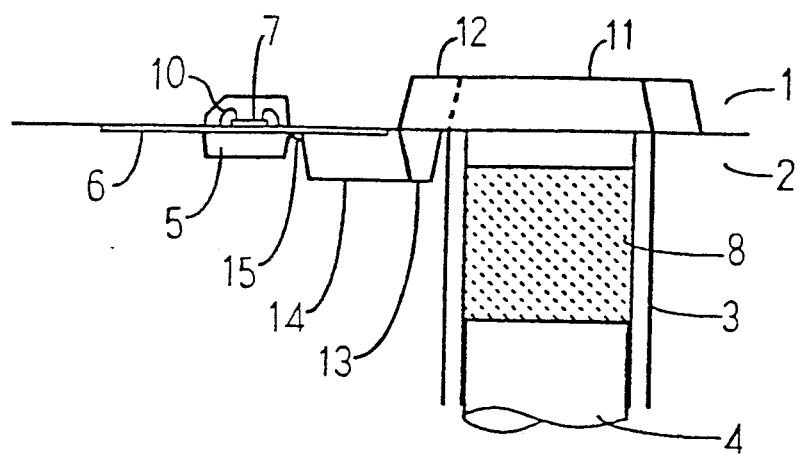
FIG. 1 is a plan view of a conventional multiple transfer molding die.
Figure 2:
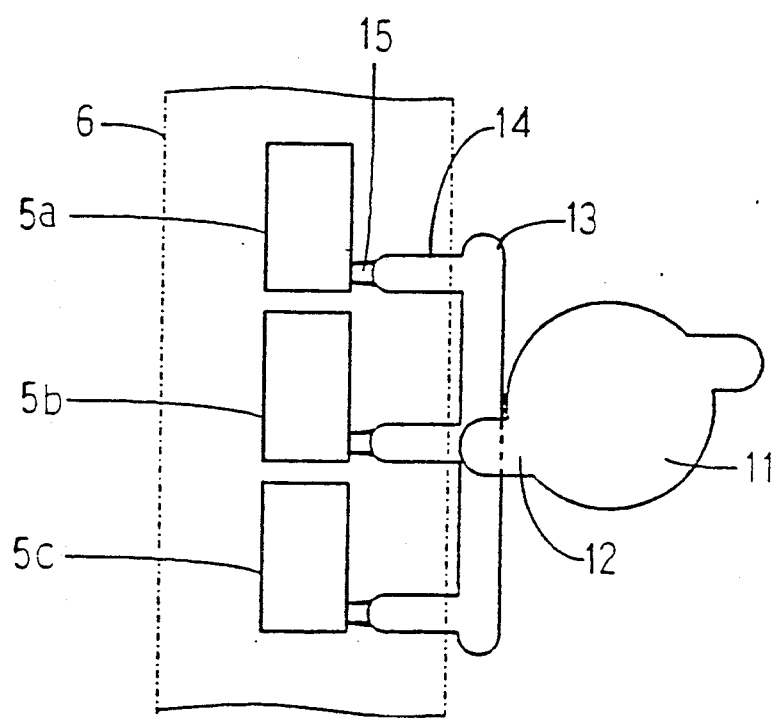
FIG. 2 is a cross sectional view of the conventional multiple transfer molding die.
Figure 3:
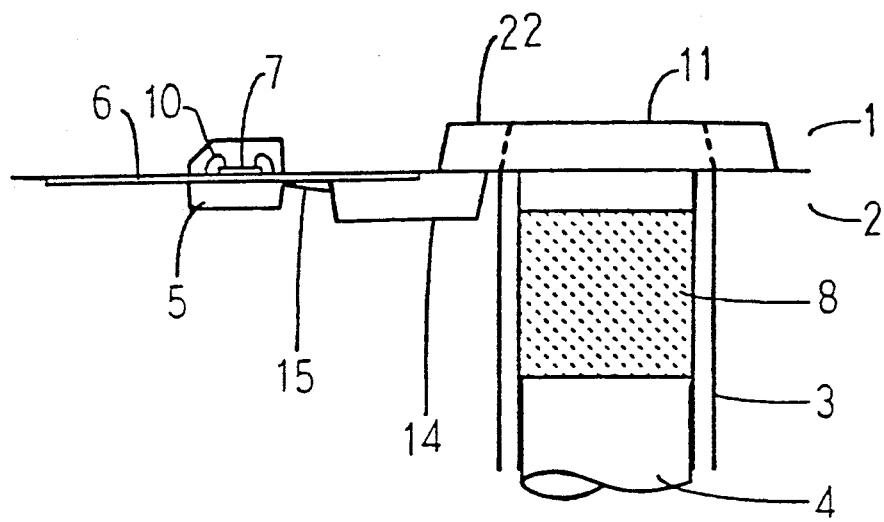
FIG. 3 is a plan view of an embodiment according to the present invention.
Figure 4:
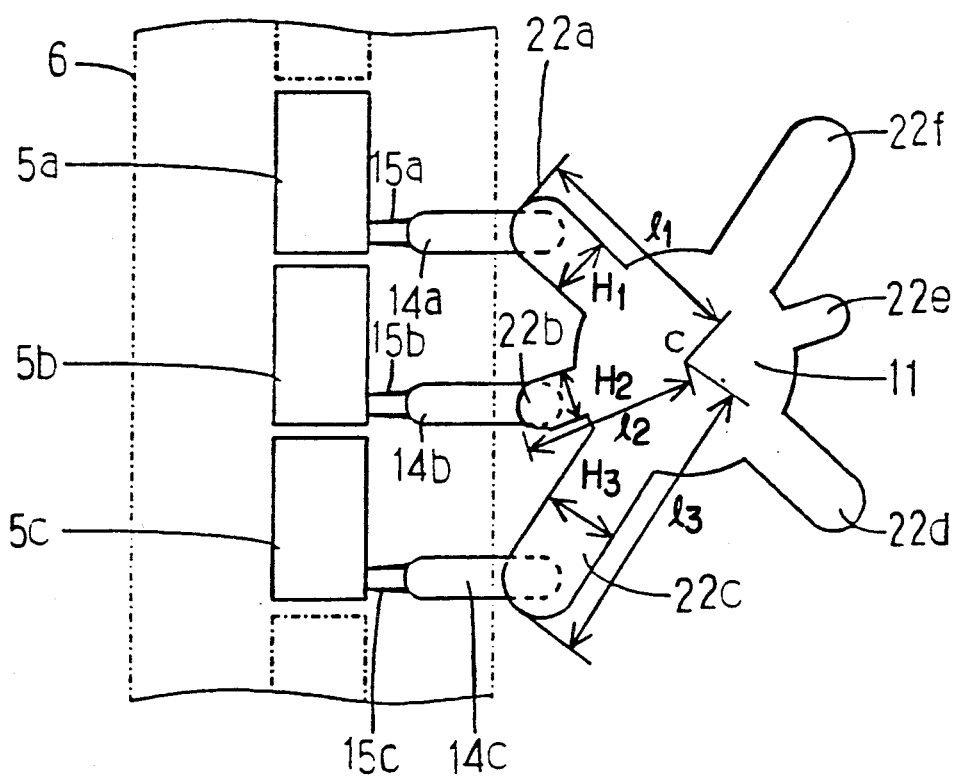
FIG. 4 is a cross sectional view of the embodiment shown in FIG. 3.

Referring now to the drawings, the present invention will be explained. FIG. 3 is a cross-sectional view of an embodiment of the present invention, and FIG. 4 is a plan view thereof. Similarly to FIG. 1 and FIG. 2, only one plunger and half of the group of the cavities disposed around the plunger are shown for the convenience of the description.

In this embodiment, cull runners 22a to 22c are individually formed for the individual cavities 5a to 5c. Namely, cull runners 22a to 22c are formed radiately from the pot 3, and are individually connected to the corresponding gate runners 14a to 14c. Since the cull runners are radially disposed, the path from the pot 3 to the gate runner 14a is shortened compared with the conventional molding die in which the sub-runner 13 is formed in parallel to the lead frame 6. As a result, this arrangement reduces the difference of the length in the resin paths.

In this embodiment, the lengths of the gate runners are equal. However, the cull runner lengths are different from each other. Namely, the length of the cull runner 22b is the shortest and that of the cull runner 22c is the longest. In connection with the differences in runner length, the widths of the runners are changed. More particularly, when the shape of cross section of the runner is rectangular, the width of the runners are chosen to satisfy the following equation.

$$l1/w1 = l2/w2 = l3/w3 \tag{1}$$

wherein l1, l2 and l3 are lengths between the pot center C and the end portion of the cull runners 22a to 22c and w1 to w3 are widths thereof. By setting the height of each cull runner equal, the sectional area is proportional to the width thereof. In other words, the cross sectional area of the cull runners is determined to be proportional to the length thereof so as to keep the ratio of the length to the width of each runner constant.

According to this embodiment, the void occurence rate in the housing of semiconductor devices is reduced to below 0.04%, compared to 26% in the conventional molding die. It can be understood that the improved resin path reduces the time lag between the longer resin path and the shorter runner path, and allows hardening of resin at the condition where all cavities are filled with resin.

Furthermore, as a result of experiments, it is shown that the margin of the transferring time of the resin becomes 7 seconds. This is extremely preferable in an automated transfer molding.

In the above mentioned embodiment, the cross section of cull runners is rectangular. However, it is possible to use other shapes, such as semicircle and trapezoid. Of course, in such cases, the cross sectional area can be determined to keep a proportional relationship with respect to the length thereof, similar to the above described embodiment.

The present invention has been described with respect to a specific embodiment. However, other embodiments based on the principles of the present invention should be obvious to those of ordinary skill in the art. Such embodiments are intended to be covered by the claims.

What is claimed is:

1. A multiple transfer molding die for molding a plurality of semiconductor devices, comprising:
   a pot, having a center, for storing molding material;
   a molding portion having a plurality of cavities for accepting the semiconductor devices; and
   a plurality of runners, each runner extending between said pot and one of said plurality of cavities, and each including a first runner portion having a remote end spaced a predetermined distance from the center of the pot, said first runner portions having varying lengths, wherein first runner portions of greater length have proportionally larger cross sectional areas.

2. The multiple transfer molding die of claim 1, wherein the ratio of the cross sectional area of each first runner portion to its length is substantially the same.

3. The multiple transfer molding die of claim 1, wherein the cross section of each first runner portion is substantially rectangular.

4. The multiple transfer molding die of claim 3 wherein each first runner portion is radially extends from the pot.

5. A transfer molding apparatus for molding semiconductor devices individually disposed in cavities connected through runners to a pot having a center,
   wherein each runner includes a first runner portion having a remote end spaced a predetermined length away from the center of the pot, and each of said first runner portions have a predetermined cross sectional area, which is proportionally related to the predetermined length of a corresponding first runner portion.

6. The transfer molding apparatus of claim 5, wherein the ratio of the cross sectional area of each first runner portion to its length is substantially the same.

* * * * *